No. 665,700. Patented Jan. 8, 1901.
A. L. STEVENS.
VEHICLE WHEEL TIRE.
(Application filed Mar. 14, 1900.)
(No Model.)
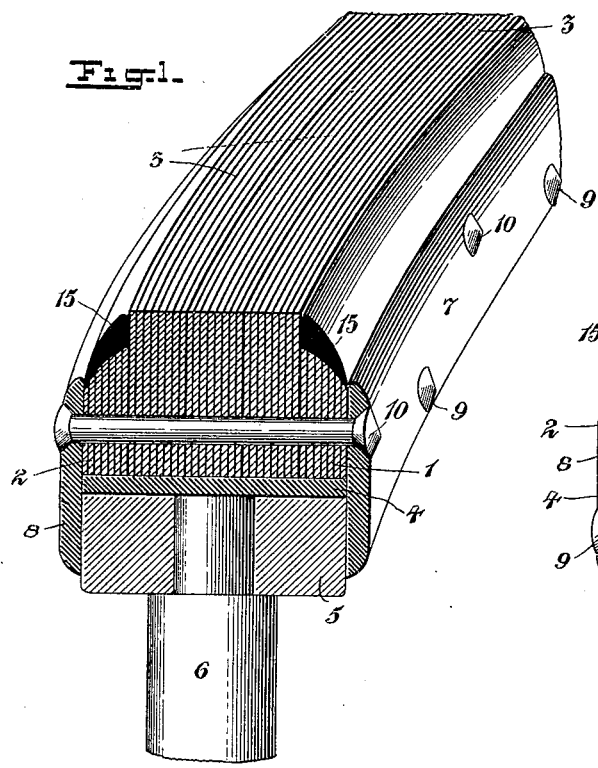
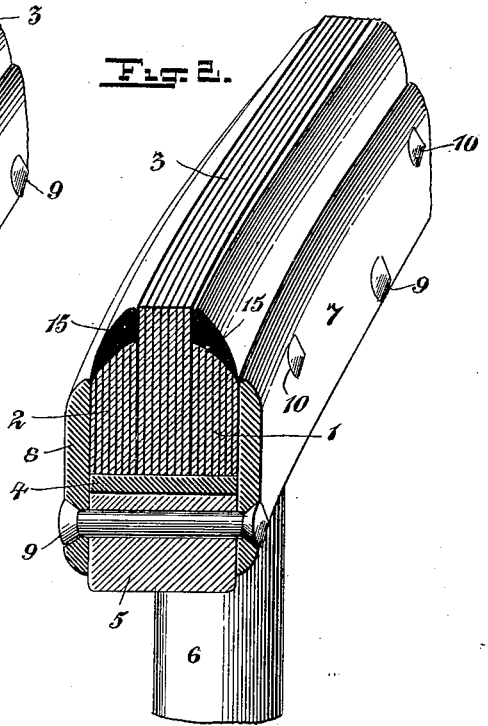
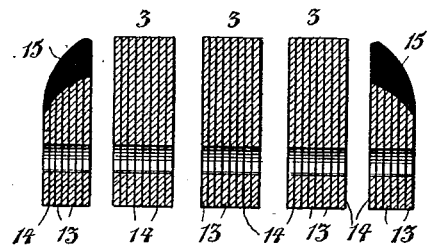
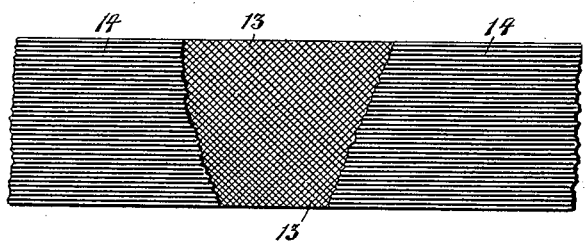
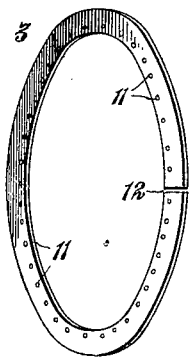
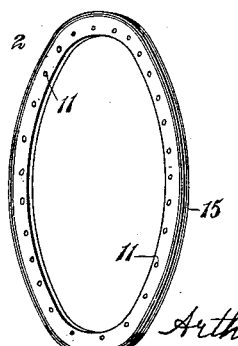
Witnesses:
Geo. W. Naylor
A. J. Doty
Inventor
Arthur L. Stevens,
By Alvin K. Goodwin,
Attorney

UNITED STATES PATENT OFFICE.

ARTHUR L. STEVENS, OF NEW YORK, N. Y.

VEHICLE-WHEEL TIRE.

SPECIFICATION forming part of Letters Patent No. 665,700, dated January 8, 1901.

Application filed March 14, 1900. Serial No. 8,627. (No model.)

*To all whom it may concern:*

Be it known that I, ARTHUR L. STEVENS, a citizen of the United States of America, residing in the borough of Manhattan, city of New York, State of New York, have invented certain new and useful Improvements in Vehicle-Wheel Tires, of which the following is a specification.

This invention relates to tires for wheels of heavy or light goods-delivery trucks or wagons, pleasure-carriages, or other vehicles.

One important object of the invention is to specially provide for aggregation or interchangeability of component parts of tires for wheels of any given diameter, whereby wider or narrower tread tires suitable respectively for wheels of heavier or lighter vehicles may be produced without delay and at minimum expense.

Another object of the invention is to provide for maximum tractive effect while preventing sidewise slipping of the wheels and giving ample elasticity, thereby promoting the economy, safety, and smoothness of travel of the vehicles.

A further object of the invention is to provide for most effective clamping and support of the interior of the tire by its opposite side portions, thereby preventing lateral spreading or "mushrooming" of the tire.

Other important objects are to provide for a uniformly-compacted and most durable wear-resisting surface all across the tread of a tire of any width, to materially cheapen the manufacture of tires of this general character, to give a smooth and pleasing finish to the opposite peripheral side edges or corners of the tire, and to promote quick and economical repair of any damaged portion of the tire.

The invention will first be described and then will be particularly defined in claims hereinafter set forth.

In the accompanying drawings, forming part of this specification, Figure 1 is a top perspective and cross-sectional view of a peripheral portion of a heavy-truck wheel fitted with one form of my improved tire. Fig. 2 likewise shows parts of a light-carriage wheel and tire. Fig. 3 is a detail cross-section of the five detached tire-rings of Fig. 1 separated from each other. Fig. 4 partly illustrates the preferred method of forming the tire-rings of bias-cut strips or layers of woven fabric with alternating layers of rubber compound adhesive. Fig. 5 is a greatly-reduced perspective view of one of the interior aggregative traction-rings of the tire, and Fig. 6 is a like perspective view of one of the outside clamping and finishing rings.

To provide for interchangeability of parts of the tire to make wider or narrower tires of any given diameter, I use right and left opposite side clamping and finishing rings or sections 1 2 and one or more interior aggregative individual traction rings or sections 3, disposed between the outside rings 1 2 and constituting the main traction-tread of the tire. Any approved means may hold these rings to each other and to the wheel-rim. I show the rings resting by their inner edges upon a metal band 4, which surrounds the felly 5 and is preferably used because it also forms a strong binder for the felly in which are fitted the wheel-spokes 6. The tire-rings will rest directly on the felly should the band 4 not be used. Opposite side flange-plates 7 8, preferably made of metal, are fixed to the felly 5 by rivets or bolts 9, as best shown in Fig. 2 of the drawings. These flange-plates project so as to overlie inner portions of the outer faces of the outside tire-rings 1 2, and rivets or bolts 10, passed laterally through the flange-plates and through holes 11 in the rings 1 2 3, securely hold all these tire rings or sections to the flange-plates and wheel-rim, as best seen in Fig. 1 of the drawings, and prevent "creeping" of the tire on the wheel-rim.

The interior traction-rings 3 are preferably made of equal thickness and depth for any given diameter of tire and may be split rings having an opening 12, as shown in Fig. 5 of the drawings. The outside tire-rings 1 2 may be made of similar materials and of any suitable thickness and are drawn a trifle smaller peripherally than the rings 3 and are preferably made endless, as shown in Fig. 6 of the drawings. It is obvious that by using one, two, or more individual traction-rings 3 between the outside rings 1 2 tires of any width having a given diameter may be easily and quickly assembled and fastened to wheels of proper width and strength for heavier or lighter vehicles. Fig. 1 of the drawings shows a tire having three traction-rings 3 and designed for quite heavy vehicle-wheels. By using but one traction-ring 3 between the outside rings 1 2, as shown in Fig. 2 of the drawings, a tire suitable for carriage or light-vehicle wheels is produced. For quite narrow tires the two specially formed and treated outside rings 1 2 only may be used when clamped or vulcanized together face to face.

I prefer to make the interior or aggregative traction-rings 3 of layers of edgewise-disposed canvas or other suitable woven fabric 13 and adhesive or binder layers 14 of rubber or rubber compound laid between the fabric layers and preferably also at the outside faces of the rings, as shown in Figs. 1, 2, and 3 of the drawings. The fabric strips 13 are preferably cut bias, as shown in Fig. 4 of the drawings, to present the ends of the fabric threads to the road for the best tractive effect and also to prevent too near approach of either the warp or weft threads lengthwise to the circumferential contour of the tire to make it difficult or impossible to pull or strip the threads from the tire-tread by traction on the road. It will be specially noticed that the reversely-arranged angularly-disposed threads of the tire-rings, such as are most easily and uniformly secured by use of the bias-cut woven fabric, have peculiar effect both tractionally and elastically. The traction strain during forward or backward rotation of the tire is taken endwise of the threads or about at an angle corresponding with the general lengthwise range of the threads and and in which direction the threads yield but slightly. Hence there is a constant maximum tractive effect. There is, however, a maximum radial elasticity of the individual or aggregated tire-rings due to the fact that there is a considerable yielding of the threads in radial lines cutting the angles described by the reversely-arranged threads. Necessary elasticity and most powerful tractive effect of the tire thus always are assured. The rubber or adhesive layers 14 preferably alternate with the fabric layers 13 and will be only thick enough to securely bind together the fabric layers 13 and preferably during vulcanization. These layers 13 14 may be laid upon each other in straight pieces to produce a straight composite strip or band which will be afterward bent around edgewise to form the split traction-rings 3, (shown in Fig. 5 of the drawings,) or the rings 3 may be formed by building up strips of woven fabric and adhesive material in an annular mold and vulcanizing them under pressure into an unsplit ring, or said rings 3 may be pressed to shape in a mold or otherwise without vulcanizing them. The fabric and rubber-compound layers at the extreme periphery of the traction ring or rings 3 take up and hold sufficient gritty or sandy road particles to augment the inherent tractive quality of said layers and assure the best tractive effect of the tire, while preventing dangerous sidewise slipping or swaying of the vehicle, and said rings 3 also have necessary elasticity and assure practically noiseless running of the vehicle. I now prefer to build up the outside clamping and finishing rings 1 2 by using layers of bias-cut fabric 13 a little narrower than the radial depth of these rings, so as to leave a facing 15 of rubber or rubber compound at the outer and preferably curved or beveled peripheral side edges of the rings and tire, as shown in Figs. 1, 2, and 3 of the drawings. These peripheral facings 15 of the outside tire-rings 1 2 may have any desired thickness. The drawings show the facings quite thick to serve as a guard or buffer, while also giving a smooth finish to the outer corners of the tire. I may prefer to make said facings 15 only thick enough to fully cover and conceal the threads at the edges of the fabric layers 13 of the outside tire-rings and for the sole purpose of assuring a smooth and pleasing finish to both peripheral side edges or corners of the tire. This smooth-corner finish is quite important for wheel-tires of carriages or other finely-finished pleasure-vehicles and is desirable for the wheel-tires of all other vehicles. The peripheries of said finishing-facings 15 will wear away only as fast as the interior traction-rings, and thus the nice finish at outer corners of the tire will be maintained. During the making of these rings 1 2, and preferably by vulcanization, I make them harder than the interior traction-rings 3 or harder than any interior elastic portion of the tire, however produced. One object of this increased hardness with special reference to the traction-rings 3 is to give said outside rings 1 2 the most effective clamping action on the rings 3, and thereby prevent outward spreading or mushrooming of their fabric and rubber adhesive layers under weight of the vehicle and load. Another object of the increased hardness of the rings 1 2 is to effectually support the traction-rings 3, while permitting the greatest possible projection of all portions of the tire beyond the metal flange-plates 7 8, and thus give the greatest possible depth of tire, which may wear away without allowing contact of plates 7 8 with the road, and thus assure great durability of the tire. The harder outer rings 1 2, while being sufficiently elastic, also prevent quick or excessive wear of the tire as it strikes ruts or rough places in the road or street-curbs or while traveling in or across railway-tracks.

To desirably combine the features of interchangeability of the central portions of the tire and the increased hardness of its outer portions, I may build up the traction-rings 3 of rubber compound and fabric and but partially cure or vulcanize them or leave them unvulcanized, while the outer clamping and finishing rings 1 2 will be formed and then cured or vulcanized harder than said rings 3. I then will place one or more of the rings 3 between two outside rings 1 2, and preferably with rubber-cement between them, and then will vulcanize all the rings together to form a complete and practically homogeneous tire having proper width for a wider or narrower wheel-rim. These combined features of interchangeability of central tread portion and increased hardness of outer side portions of the tire thus are obtainable whether or not the side parts 1 2 have the finishing-facings 15 of rubber compound at their peripheries.

My prior patent, No. 650,621, granted May 29, 1900, describes and claims a vehicle-wheel tire comprising layers of edgewise-disposed woven fabric and rubber adhesive compacted all at once and preferably by or during vulcanization into one homogeneous tire mass having proper width for the particular wheel-rim to which it is to be fastened. This prior construction is practically like that of one of the herein-described traction-rings 3; but these comparatively thin individual traction-rings permit assembling or building up of tires of any required width by using one or more of the ready-made rings 3 out of stock to accommodate narrow or wide rimmed wheels having like diameter. This makes a marked improvement in tire construction aside from the further improvement of providing harder outside clamping and finishing rings 1 2, made either with or without a facing 15 of rubber compound at their peripheries. A further important advantage is that the expense of making molds in which to vulcanize the tires is greatly reduced, as but one shallow mold—say from one-half to three-quarters of an inch deep—is needed for the inner traction-rings 3 and two right and left shallow molds for the outside clamping and finishing rings 1 2. These shallow molds, permitting production of any width of tires of a given diameter, may be made and operated at much less expense than a series of molds for any given diameter of tire having a certain depth for each corresponding width of tire. Another advantage is that by using these inexpensive shallow molds the materials of the comparatively thin tire-rings will be uniformly compacted under pressure or during vulcanization. Hence no matter how many of the inner traction-rings 3 may be used between two outside clamping and finishing rings 1 2 all the rings 3, which mainly form the traction-tread of a tire, will have a most desirable uniform density and elasticity, assuring great durability of the tire on all kinds of roads and promoting easy travel of the vehicle. The comparative thinness of the tire-rings also permits easy and quick stamping or cutting through them of the holes 11 to receive the tire-fastening bolts.

A further important advantage of making the tire in a series of comparatively thin rings comprising layers of fibrous material and an adhesive substance is that it materially reduces the cost of making a tire of any width, because the inner traction-rings 3 may be cheaply produced by first building up a broad-calendered sheet of alternate layers of fabric and adhesive, then cutting this sheet preferably on the bias into strips as wide as the depth of the tire-rings, then bending these strips around edgewise and preferably scarf-joining their ends, and then vulcanizing the rings in the shallow mold. A tire built up of separately-formed rings, as herein described, may be quickly and economically repaired should any particular portion of its tread be seriously damaged by removing the injured ring and substituting a new one. This repair is more easily effected when the individual rings are simply clamped and not vulcanized together. A brake shoe or plate may be applied most effectively to the periphery of this improved tire without injuring it, and in this respect also the tire has an important advantage over the ordinary pneumatic tire or any other tire having an all-rubber tread.

I do not broadly claim as my invention a vehicle-wheel tire made of rings of any material clamped together face to face and presenting their edges to the road, as tires have heretofore been made of leather rings so clamped together. Such leather tires are very liable to soften under weather influences, and thus break down and wear easily, and they also lack requisite elasticity. Edgewise-disposed layers of cork alternating with rubber solution and incased (or not) by a thin cork or rubber covering also have been used in tires, but the friable nature of cork or any compound thereof causes quick wear and disintegration of the tires. From all such tires my invention is readily distinguishable both structurally and operatively.

As rubber or rubber compound is used in these tires because of its peculiar elastic and adhesive and tractive and durable qualities, it is obvious that any other substance or compound now or hereafter to be known which has such qualities in necessary degree may be substituted for rubber or its compounds within the scope of this invention and patent. The term "rubber" used in this specification is therefore to be construed as including rubber or its compounds or any other substance having substantially similar qualities.

I claim as my invention—

1. A vehicle-wheel tire having an interior body portion formed of individual traction-rings each comprising compacted layers of angularly-disposed fibrous threads presenting their ends to the road.

2. A vehicle-wheel tire having an interior body portion formed of individually-vulcanized traction-rings each comprising an adhesive and layers of angularly-disposed fibrous threads presenting their ends to the road.

3. A vehicle-wheel tire having an interior body portion formed of one or more traction-rings each comprising compacted layers of angularly-disposed fibrous threads presenting their ends to the road, fibrous opposite side clamping-rings, and means fastening said traction and clamping rings to a wheel-rim.

4. A vehicle-wheel tire comprising one or more individual aggregative interior traction-rings each formed of compacted layers of edgewise-disposed woven fabric and a rubber adhesive; and opposite side clamping-rings.

5. A vehicle-wheel tire comprising one or more individual aggregative interior traction-rings each formed of edgewise-disposed layers of woven fabric and a rubber adhesive compacted by or during vulcanization; and opposite side clamping-rings.

6. A vehicle-wheel tire comprising one or more individual aggregative interior traction-rings and opposite side clamping-rings, all of said rings being formed with compacted edgewise-disposed layers of woven fabric and a rubber adhesive.

7. A vehicle-wheel tire comprising one or more individual aggregative interior traction-rings and opposite side clamping-rings, all of said rings being formed with edgewise-disposed layers of woven fabric and a rubber adhesive compacted by or during vulcanization.

8. A vehicle-wheel tire comprising one or more individual aggregative interior traction-rings, and opposite side clamping-rings made harder than said traction-rings.

9. A vehicle-wheel tire comprising one or more individual aggregative interior traction-rings, and opposite side clamping-rings made harder than said traction-rings, and having a facing of rubber compound at their outer peripheral portions.

10. A vehicle-wheel tire comprising one or more individual aggregative interior traction-rings, and opposite side clamping-rings formed with compacted edgewise-disposed layers of woven fabric and a rubber adhesive.

11. A vehicle-wheel tire comprising one or more individual aggregative interior traction-rings, and opposite side clamping-rings made harder than the traction-rings and formed with compacted edgewise-disposed layers of woven fabric and a rubber adhesive.

12. A vehicle-wheel tire comprising one or more individual aggregative interior traction-rings, and opposite side clamping-rings formed with edgewise-disposed layers of woven fabric and a rubber adhesive compacted by or during vulcanization.

13. A vehicle-wheel tire comprising one or more individual aggregative interior traction-rings, and opposite side clamping-rings made with edgewise-disposed layers of woven fabric and a rubber adhesive compacted by or during vulcanization, and made harder than the traction-rings.

14. A vehicle-wheel tire comprising one or more individual aggregative interior traction-rings, and opposite side clamping-rings made with compacted edgewise-disposed layers of woven fabric and a rubber adhesive and having a facing of rubber compound at their outer peripheral portions.

15. A vehicle-wheel tire comprising one or more individual aggregative interior traction-rings, and opposite side clamping-rings made with edgewise-disposed layers of woven fabric and a rubber adhesive compacted by or during vulcanization and having a facing of rubber compound at their outer peripheral portions.

16. A vehicle-wheel tire comprising one or more individual aggregative interior traction-rings, and opposite side clamping-rings made harder than the traction-rings; all of said rings being formed with compacted edgewise-disposed layers of woven fabric and a rubber adhesive.

17. A vehicle-wheel tire comprising one or more individual aggregative interior traction-rings, and opposite side clamping-rings made harder than the traction-rings; all of said rings being formed with edgewise-disposed layers of woven fabric and a rubber adhesive compacted by or during vulcanization.

18. A vehicle-wheel tire comprising one or more individual aggregative interior traction-rings, and opposite side clamping-rings made harder than the traction-rings; all of said rings being formed with compacted edgewise-disposed layers of woven fabric and a rubber adhesive, and said clamping-rings having a facing of rubber compound at their outer peripheral portions.

19. A vehicle-wheel tire comprising one or more individual aggregative interior traction-rings, and opposite side clamping-rings made harder than the traction-rings; all of said rings being formed with edgewise-disposed layers of woven fabric and a rubber adhesive compacted by or during vulcanization and said clamping-rings having a facing of rubber compound at their outer peripheral portions.

20. A vehicle-wheel tire having peripheral side portions made harder than its central or intermediate traction portion which comprises edgewise-disposed fibrous material and an adhesive.

21. A vehicle-wheel tire having peripheral side portions vulcanized harder than its central or intermediate traction portion which comprises edgewise-disposed fibrous material and an adhesive.

22. A vehicle-wheel tire having side portions including a peripheral facing of rubber compound and vulcanized harder than the central or intermediate traction portion of the tire which comprises edgewise-disposed fibrous material and an adhesive.

23. A vehicle-wheel tire individual interior traction-ring comprising edgewise-disposed layers of woven fabric and a rubber adhesive and adapted for use in any required number to provide various widths of tires for any given diameter of wheel.

24. A vehicle-wheel tire individual interior traction-ring comprising edgewise-disposed layers of bias-cut woven fabric and a rubber adhesive and adapted for use in any required number to provide various widths of tires for any given diameter of wheel.

25. A vehicle-wheel tire individual interior traction-ring comprising edgewise-disposed layers of woven fabric and a rubber adhesive compacted by or during vulcanization and adapted for use in any required number to provide various widths of tires for any given diameter of wheel.

26. A vehicle-wheel tire individual interior traction-ring comprising edgewise-disposed layers of bias-cut woven fabric and a rubber adhesive compacted by or during vulcanization and adapted for use in any required number to provide various widths of tires for any given diameter of wheel.

27. A vehicle-wheel tire individual outside ring adapted to clamp interior portions of the tire and formed with compacted edgewise-disposed layers of woven fabric and a rubber adhesive.

28. A vehicle-wheel tire individual outside ring adapted to clamp interior portions of the tire and formed with edgewise-disposed layers of bias-cut woven fabric and a rubber adhesive.

29. A vehicle-wheel tire individual outside ring adapted to clamp interior portions of the tire and formed with edgewise-disposed layers of woven fabric and a rubber adhesive compacted by or during vulcanization.

30. A vehicle-wheel tire individual outside ring adapted to clamp interior portions of the tire and formed with edgewise-disposed layers of bias-cut woven fabric and a rubber adhesive compacted by or during vulcanization.

31. A vehicle-wheel tire individual outside ring adapted to clamp interior portions of the tire and formed with compacted edgewise-disposed layers of woven fabric and a rubber adhesive and having a facing of rubber compound at its periphery.

32. A vehicle-wheel tire individual outside ring adapted to clamp interior portions of the tire and formed with compacted edgewise-disposed layers of bias-cut woven fabric and a rubber adhesive and having a facing of rubber compound at its periphery.

33. A vehicle-wheel tire individual outside ring adapted to clamp interior portions of the tire and formed with edgewise-disposed layers of woven fabric and a rubber adhesive compacted by or during vulcanization and having a facing of rubber compound at its periphery.

34. A vehicle-wheel tire individual outside ring adapted to clamp interior portions of the tire and formed with edgewise-disposed layers of bias-cut woven fabric and a rubber adhesive compacted by or during vulcanization and having a facing of rubber compound at its periphery.

35. The herein-described method of making vehicle-wheel tires, which consists in building up fibrous material and a vulcanizable substance into individual interior traction-rings and opposite side clamping-rings, then vulcanizing said individual rings, then placing one or more of said traction-rings between said clamping-rings, and then securing all the rings together face to face to produce a tire of the desired width, as set forth.

36. The herein-described method of making vehicle-wheel tires, which consists in building up fibrous material and a vulcanizable substance into individual traction-rings and opposite side clamping-rings, then placing one or more of said traction-rings between said clamping-rings, and then vulcanizing all the rings together face to face to produce a tire of the desired width, as set forth.

37. The herein-described method of making vehicle-wheel tires, which consists in building up layers of woven fabric and a vulcanizable adhesive into individual traction-rings and opposite side clamping-rings, then vulcanizing said individual rings, then placing one or more of said traction-rings between said clamping-rings, and then securing all the rings together face to face to produce a tire of the desired width, as set forth.

38. The herein-described method of making vehicle-wheel tires, which consists in building up layers of woven fabric and a vulcanizable substance into individual interior traction-rings and opposite side clamping-rings, then placing one or more of said traction-rings between said clamping-rings, and then vulcanizing all the rings together face to face to produce a tire of the desired width, as set forth.

39. The herein-described method of making vehicle-wheel tires, which consists in building up fibrous and vulcanizable materials into individual interior traction-rings and opposite side clamping-rings, then partially curing or vulcanizing said clamping-rings, then placing one or more traction-rings which are uncured or cured to a lesser degree than said clamping-rings between the latter rings, and then vulcanizing all the rings together face to face, thereby providing a tire of any desired width having outer side portions harder than the intermediate tread portion, as set forth.

40. The herein-described method of making vehicle-wheel tires, which consists in building up layers of woven fabric and a vulcanizable adhesive into individual interior traction-rings and opposite side clamping-rings, then partially curing or vulcanizing said clamping-rings, then placing one or more traction-rings which are uncured or cured to a lesser degree than said clamping-rings between the latter rings, and then vulcanizing the rings together face to face, thereby providing a tire of any desired width having outer side portions harder than the intermediate tread portion, as set forth.

ARTHUR L. STEVENS.

Witnesses:
ALVIN K. GOODWIN,
J. ARTHUR FISCHER.